(12) United States Patent
Andresen

(10) Patent No.: US 6,477,813 B2
(45) Date of Patent: Nov. 12, 2002

(54) FIRE PROTECTION SLEEVE

(75) Inventor: Arndt Andresen, Landsberg/Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/928,552

(22) Filed: Aug. 13, 2001

(65) Prior Publication Data

US 2002/0056242 A1 May 16, 2002

(30) Foreign Application Priority Data

Aug. 14, 2000 (DE) .......................... 100 39 720

(51) Int. Cl.⁷ ................................. F16L 5/00
(52) U.S. Cl. .................. 52/220.8; 52/232; 137/360; 285/187
(58) Field of Search ................ 52/2.14, 220.8, 52/232, 1; 137/360, 362, 72, 75; 285/192, 194, 216, 187

(56) References Cited

U.S. PATENT DOCUMENTS

| 4,109,423 | A | * | 8/1978 | Perrain | 137/360 |
| 4,538,389 | A | * | 9/1985 | Heinen | 137/75 |
| 4,796,401 | A | * | 1/1989 | Wexler | 52/1 |
| 5,058,341 | A | * | 10/1991 | Harbeke, Jr. | 52/232 |
| 5,103,609 | A | * | 4/1992 | Thoreson et al. | 52/232 |
| 5,351,448 | A | * | 10/1994 | Gohlke et al. | 52/1 |
| 5,452,551 | A | * | 9/1995 | Charland et al. | 52/1 |
| 5,941,070 | A | * | 8/1999 | Oldham | 285/187 |

FOREIGN PATENT DOCUMENTS

| DE | 3930722 A1 | * | 3/1991 | F16L/5/02 |
| EP | 486299 | * | 5/1992 | F16L/5/02 |
| EP | 988873 A2 | * | 3/2000 | A62C/2/06 |
| GB | 2233725 A | * | 1/1991 | F16L/5/00 |
| JP | 404337183 A | * | 11/1992 | 52/220.8 |
| WO | WO 8904407 | * | 5/1989 | 52/232 |

* cited by examiner

Primary Examiner—Robert Canfield
Assistant Examiner—Brian E. Glessner
(74) Attorney, Agent, or Firm—Sidley Austin Brown & Wood, LLP

(57) ABSTRACT

A fire protection sleeve (1) for a pipeline (4), which extends through an opening (2) in a wall (3), is surrounded circumferentially at least partly by intumescing material (10) contained in a fire-resistant folded fabric tube (5). The fabric tube (5) forms several circumferential, unilateral inner folds (6) and the folds (6) are sewn in each case with a yarn (8), to an opposite side of the tube, and the yarn melts or burns in the event of a fire.

10 Claims, 4 Drawing Sheets

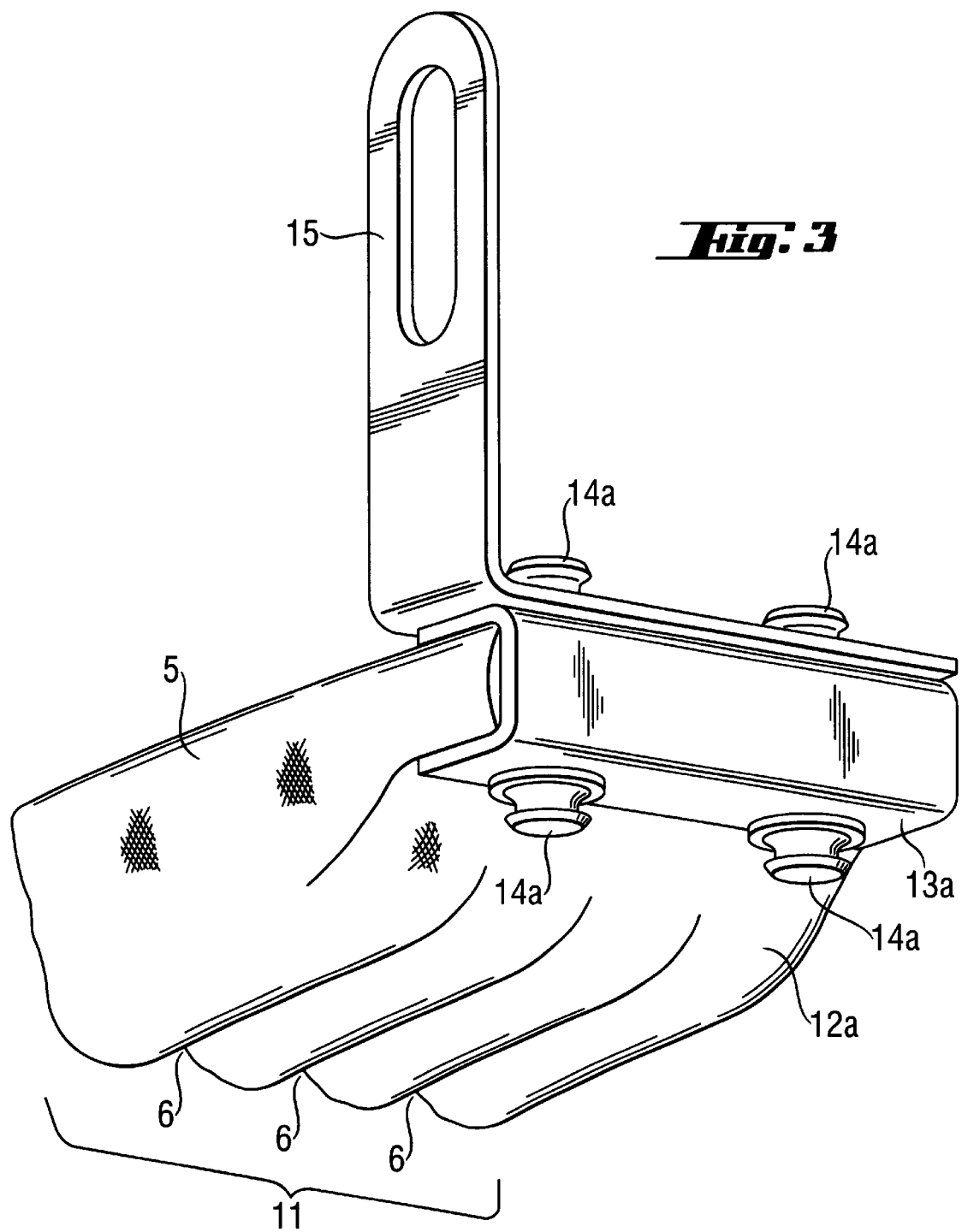

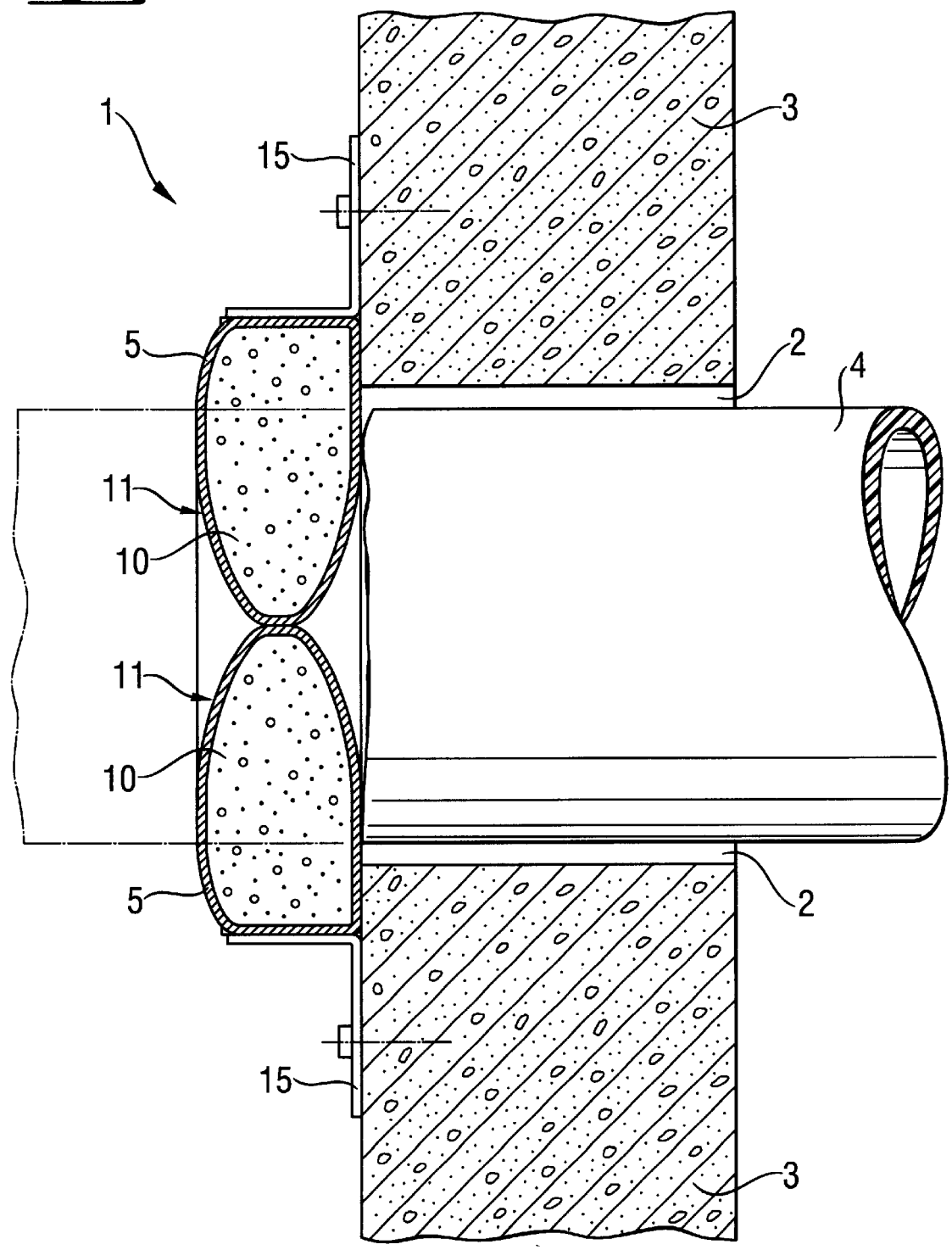

FIRE PROTECTION SLEEVE

FIELD OF INVENTION

The invention relates to a fire protection sleeve for pipes, cables and the like.

BACKGROUND INFORMATION AND PRIOR ART

Fire protection sleeves are used as fire protection elements for masonry openings in the walls, ceilings or floors of buildings. There the fire protection sleeves are intended to close off the masonry openings in the case of combustible or rapidly melting pipes, cables and the like of plastic, glass, aluminum, and the like, in order to prevent flashover of a fire. The known fire protection sleeves usually have a tubular metallic housing with an opening and a closing mechanism and an opposite hinge for a subsequent installation. This, in turn, makes it difficult or impossible to position these fire protection devices directly at pipe bends or also at pipes passed through at an angle.

Usually, an adequate amount of intumescing material is placed in this housing and, as a rule, embedded in a binder matrix. In the event of a fire, this material expands and closes off the opening resulting from the burning away or melting of the pipe or cable. The larger the diameter of the opening, which is to be closed off, and the higher the pressure, which results from the fire (furnace pressure), the more difficult is it to close off the opening formed in the event of a fire. In addition, the fire protection device with the intumescing material also have to withstand the pressure of the extinguishing water after the fire. Mechanical components, such as springs, flaps, and the like, or chemical additives in the binder matrix, such as ammonium polyphosphate, zinc borate, and the like, support the closing effect of the intumescing material. The known mechanical or chemical aids fulfill their function satisfactorily only for openings of relatively small diameter. Furthermore, they make the manufacture and the later application more expensive and more difficult.

According to the U.S. Pat. No. 4,109,423, a mechanical blocking element, which squeezes off and thus closes off a pipe passing through an opening, is closed by the intumescing composition integrated in the fire protection sleeve. In the case of installation sites, to which access is difficult, especially a stiff blocking element as well as a stiff housing are a disadvantage.

According to the DE 3930722 A1, a fire protection sleeve contains, within a stiff housing, an intumescing composition, which is present in a loose, granulated, flowable form in compartmentalized, partially filled, combustible bags and is based particularly on a mixture of expanding graphite and binder. Each part of an additional curtain, closing off the annular space as a blocking element, is formed of a woven glass tube. Each piece of tube is folded together flat. Especially the stiff housing is a disadvantage in the case of installation sites, to which access is difficult.

According to the WO 97104838, a fiberglass fabric on an inner side of a metallic sleeve contains a woven fiberglass fabric for limiting the spread of the intumescing material. Especially the stiff metallic sleeve is a disadvantage in the case of installation sites, to which access is difficult.

According to EP 988873 as well as U.S. Pat. No. 4,538,389, an intumescing composition of a fire protection sleeve fills a sleeve or an extensible, incombustible fabric tube, which may be closed and folded. The limited possibility of attaching such a fabric tube is a disadvantage of such a solution.

OBJECT OF THE INVENTION

Therefore it is a primary object of the present invention to provide a fire protection sleeve which, in the event of a fire, also reliably closes openings of a larger diameter, withstands higher fire pressures and stands up to the pressure of extinguishing water, the appropriate application being fully ensured directly at or under pipe bends and inclined pipe openings.

SUMMARY OF THE INVENTION

Essentially, a fire protection sleeve for a pipeline, extending through an opening in a wall, has a fire-resistant fabric tube of specified length and circumference, which essentially surrounds the pipeline and is divided into several chambers, which in each case contain initumescing material, by the peripheral, one-sided folding of the fabric tube and by connecting the one-sided inner folds along their inner ends with the opposite side of the fabric tube contacting them with a thread, which melts or burns in the event of a fire at temperatures above about 200° C.

Advantageously, the folds are connected to the fabric tube by sewing or gluing.

The fire-resistant fabric tube consists advantageously of a tight fiberglass, silicate, ceramic, silica, or Teflon fabric, inorganic fiber materials or combinations thereof, which as such, are not at all or only slightly extensible. Due to the peripheral, one-sided folding and sewing of the fabric, the cross sectional volume contained by the periphery of the fabric tube is reduced significantly.

Chambers, which are advantageously adjacent in pairs and disposed next to one another, form a flat, flexible tube tape, which furthermore advantageously essentially encloses the periphery of the pipeline.

Advantageously, the tube tape is closed off at both ends mechanically with locking means, as a result of which a closed volume, in which the intumescing material can spread out, is formed per chamber.

The locking means advantageously are constructed from a fire-resistant, inflexible, U-shaped profile or as a steel clamping profile, which unilaterally takes up an end of the tube tape in itself, which has been compressed into itself.

Advantageously, a connecting element is disposed at the locking means, such as a hook and eye connection or a connector coupling connection, which in each case connects two ends of one or more tube tapes detachably with one another.

The whole tube tape, which may be composed of individual tapes, advantageously, has a length, corresponding to the circumference of the pipeline which is to be closed off, and is placed around the pipeline and, as a torus, is closed off by a connecting element.

Furthermore, a fastening element advantageously is disposed at least at one locking means, such as an angular assembly plate with an elongated hole, which permits assembly at a wall or ceiling.

Advantageously; the intumescing material, enclosed in the chambers, consists of a mixture of raw materials, which has only been processed and is therefore relatively inexpensive and does not contain any additional binder matrix. Furthermore, advantageously, the intumescing materials, in granular or granulated form, fill the chambers at least partly.

As a result, the tube tape can be deformed plastically in all directions. Furthermore, in the event of a fire, the intumescing material expands sufficiently to fill up the unfolding fabric tube. Accordingly, difficult applications, such as inclined pipe openings or an installation directly under a pipe bend, are also possible.

In the event of a fire, the yarn melts or burns and the intumescing material, contained in the chambers, expands. The tube tape is dimensioned so that, when the chambers are unfolded completely, the opening, which is to be closed off, is closed off sufficiently. The intumescing material can expand only inwards in the direction of the center of the pipeline because the fabric tube forming the tube tape does not permit an increase in its length or an enlargement of its outer circumference and, with that, an expansion in a different direction.

Since the fabric tube, enveloping the expanding material, is closed and still present even after the fire, sufficient strength to resist external mechanical effects is ensured during as well as after the fire.

Accordingly, the fire protection sleeve, which can be deformed pursuant to the invention, can be used without a stiff housing and without other essentially stiff components for pipelines of different diameters and for installation sites to which access is difficult (inclined pipe opening, pipe bends).

The intumescing material, which is present as a mixture without a binder matrix, is activated more rapidly in the event of a fire and achieves a higher swelling pressure during the expansion.

The crust structure of the expanding material, closed off by the fabric tube, leads to a higher strength during as well as after a fire.

BRIEF DESCRIPTION OF THE DRAWINGS

The invention is explained in greater detail with respect to an advantageous example. In the drawings.

FIG. 3 is a perspective view of a connection of the tube tape to a support surface; and FIG. 4 is a sectional side view of the tube tape after it is expanded.

DETAILED DESCRIPTION OF THE INVENTION

Figure 1:
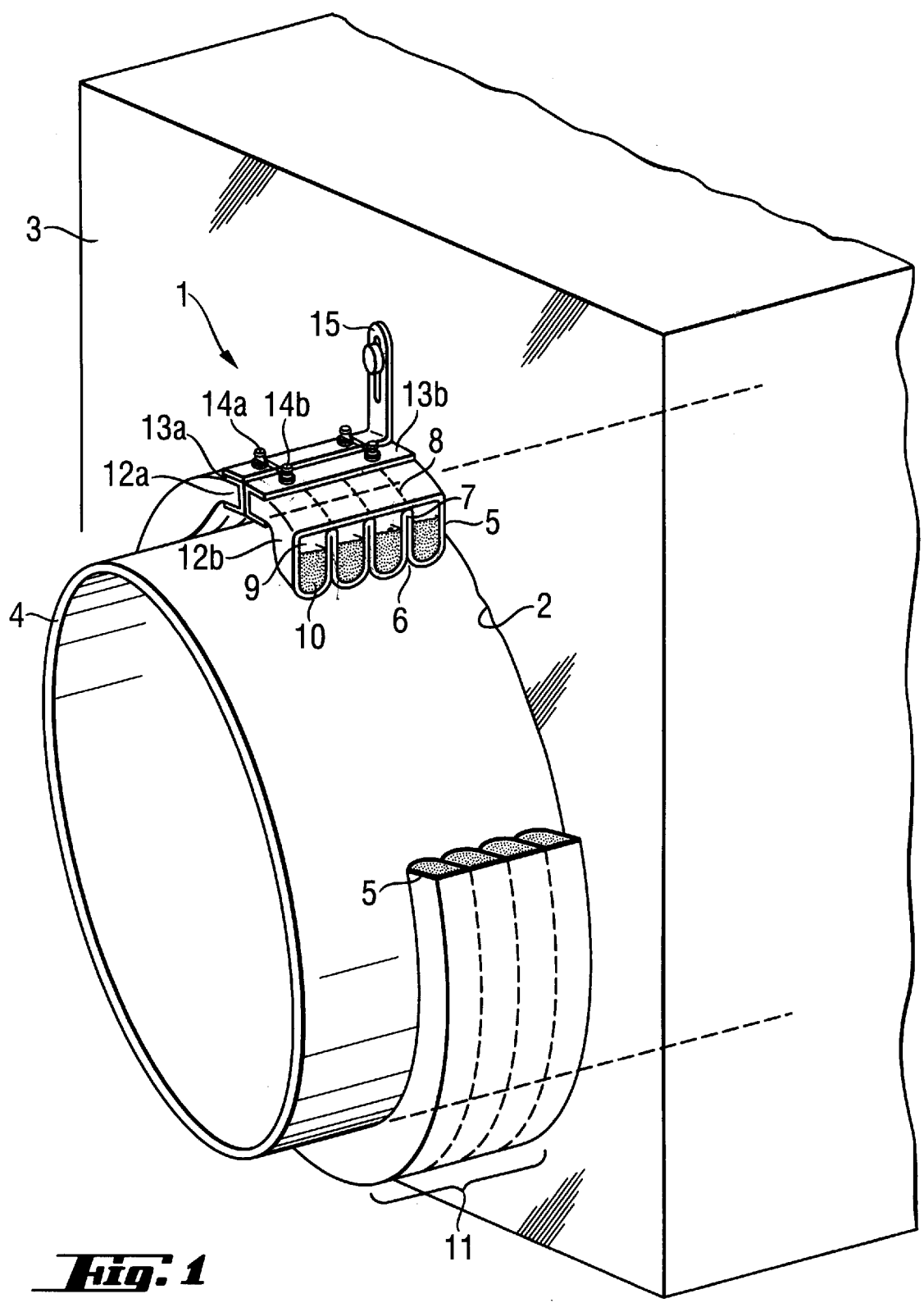
FIG. 1 is a perspective view of a fire protection sleeve with the sleeve partly broken away.
Figure 2:
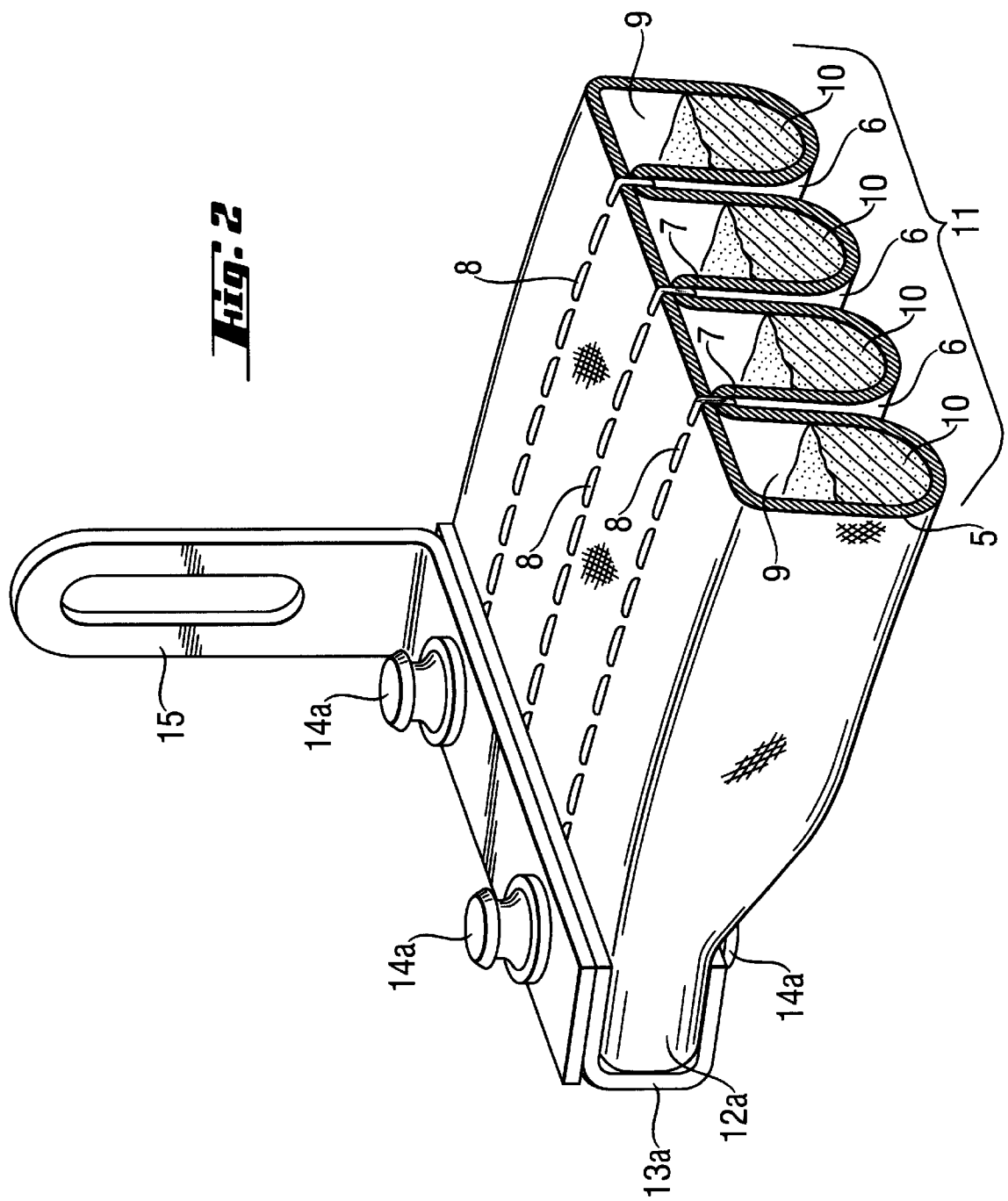
FIG. 2 is a perspective view of an enlarged section through a tubular tape.

According to FIG. 1 and the details in FIGS. 2 and 3, a fire protection sleeve 1 has a fire-resistant fabric tube 5 of a tight fiberglass fabric of specified length and circumference, which essentially surrounds the circumference of a pipeline 4, which extends through an opening 2 in wall 3. The length of the fabric tube 5 is slightly greater than the circumference of the pipeline 4 and the circumference of the fabric tube 5 is slightly greater than the diameter of the pipeline 4. The fabric tube 5 is divided into several chambers 9, each of which contains intumescing material 10, by circumferential, one-sided folding of the tube from one side to the opposite side and by sewing the one-sided inner fold 6 of the fabric tube 5 along the inner ends 7 with the opposite side of the fabric tube 5 contacting them with a yarn 8, which melts in the event of a fire at about 200° C. Chambers 9, which are advantageously adjacent in pairs and disposed next to one another, form a flat, flexible tube tape 11, which essentially encloses the periphery of the pipeline 4. The tube tape 11 is closed off mechanically at each of the two ends 12a and 12b with closing means 13a, 13b in the form of a U-shaped steel profile, each of which closes off an end 12a, 12b of the tape belt 11, which is pressed together into the steel profile. At each of the closing means 13a, 13b, a connecting element 14a, 14b is disposed in the form of a connector coupling connection, which in each case detachably connects two assigned ends 12a, 12b of a tube tape 11 with one another. The whole of the tube tape 11 is placed around the pipeline 4 and, as a torus, closed over the connecting elements 14a, 14b. At the closing means 13a, a fastening element 15 in the form of an angular assembly plate with an elongated hole is disposed, which is mounted at the wall 3.

According to FIG. 4, the fire-protection sleeve 1, which is installed with the fastening element 15 at the wall 3, has, after a fire, essentially closed off the opening 2 which, by burning or melting of the pipeline 4, previously extending through the opening 2, is open at the fire side. The fire-resistant fabric tube 5, previously essentially around the pipeline 4, is essentially unfolded by the fire and, completely filled with the expanded intumescing material 10, forms the shape of a torus with an essentially toroidal opening. The fabric tube 5 thus forms a mechanical outer protective sleeve for the expanded intumescing material 10.

What is claimed is:

1. A fire protection sleeve for one of a pipeline (4) and a cable through opening extending through an opening (2) in a wall (3), comprising an intumescing material (10), held in a fire-resistant, folded fabric tube (5), wherein said tube is elongated having a first end and a second end with the fabric tube deformed from one side to an opposite other side into inner folds (6) spaced laterally apart and extending from the one side to the opposite other side connected to the one side with a yarn (8) which at least one of melts or burns in the event of a fire.

2. A fire protection sleeve as set forth in claim 1, wherein the fire-resistant fabric tube (5) comprises at least one of tight fiberglass, silicate, ceramic, Teflon fabrics, inorganic fiber materials or combinations thereof.

3. A fire protection sleeve as set forth in claim 1, wherein the folds (6) are sewn along ends of the folds contacting the other side for dividing the tube (5) into chambers (9) at least some of which contain said intusmesing material (10).

4. A fire protection sleeve as set forth in claim 3, wherein the tube (5), along with the chambers (9), arranged adjacent in pairs disposed next to one another, forming a flat, flexible tube tape (11).

5. A fire protection sleeve as set forth in claim 4, wherein the first and second ends of said tube (5) are shut off by closing means (13a, 13b).

6. A fire protection sleeve as set forth in claim 5, wherein said closing means (13a, 13b) comprises fire-resistant, inflexible profiled members each arranged to receive one of said first and second ends of said tube tape (11), with the ends pressed into said profiled member.

7. A fire protection sleeve as set forth in claim 6, wherein, at said closing means (13a, 13b), a connecting element (14a, 14b) is arranged to detactably connect the first and second ends of at least one tube tape (11) together.

8. A fire protection sleeve as set forth in claim 7, wherein the tube tape (11) comprising at least one tube tape (11) has a length between the first and second ends thereof corresponding to a circumference of the pipeline (4), to be closed off and forms a torus by said connecting element (14a, 14b) encircling the pipeline.

9. A fire protection sleeve as set forth in claims 8, wherein a fastening element (15), for securing the tube tape (11) to one of a wall and a ceiling is secured to at least one said closing means (13*a*).

10. A fire protection sleeve as set forth in claim 1, wherein said intumescing material (10), enclosed in the fabric tube (5), comprising a mixture of at least one granular and granulated form.

* * * * *